Nov. 25, 1947. S. B. WINN 2,431,531
TRACTOR-TRAILER COMBINATION AND TRAILER PROP
Filed Nov. 3, 1945 3 Sheets-Sheet 2
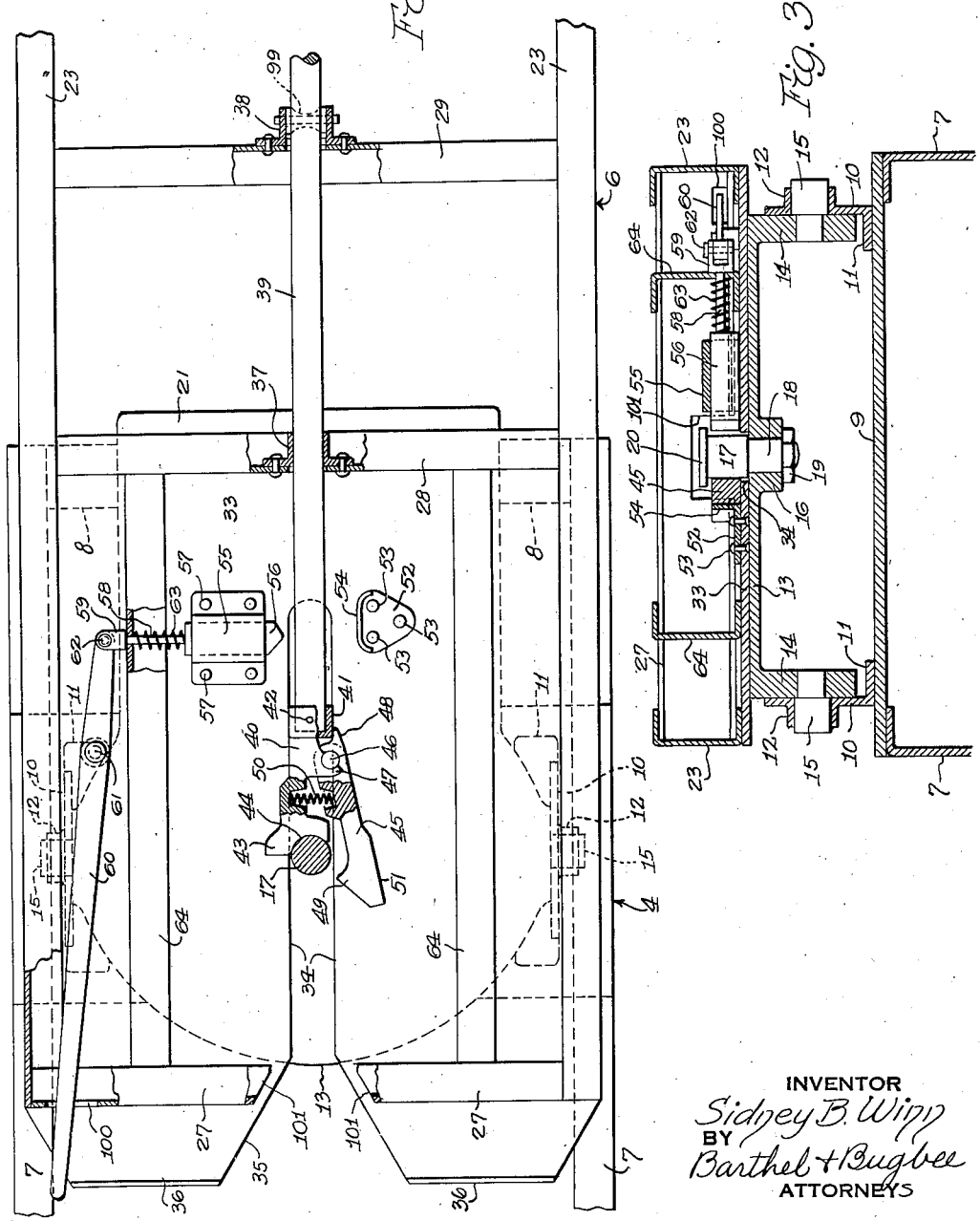
INVENTOR
Sidney B. Winn
BY
Barthel + Bugbee
ATTORNEYS Nov. 25, 1947.   S. B. WINN   2,431,531
TRACTOR-TRAILER COMBINATION AND TRAILER PROP
Filed Nov. 3, 1945    3 Sheets-Sheet 3
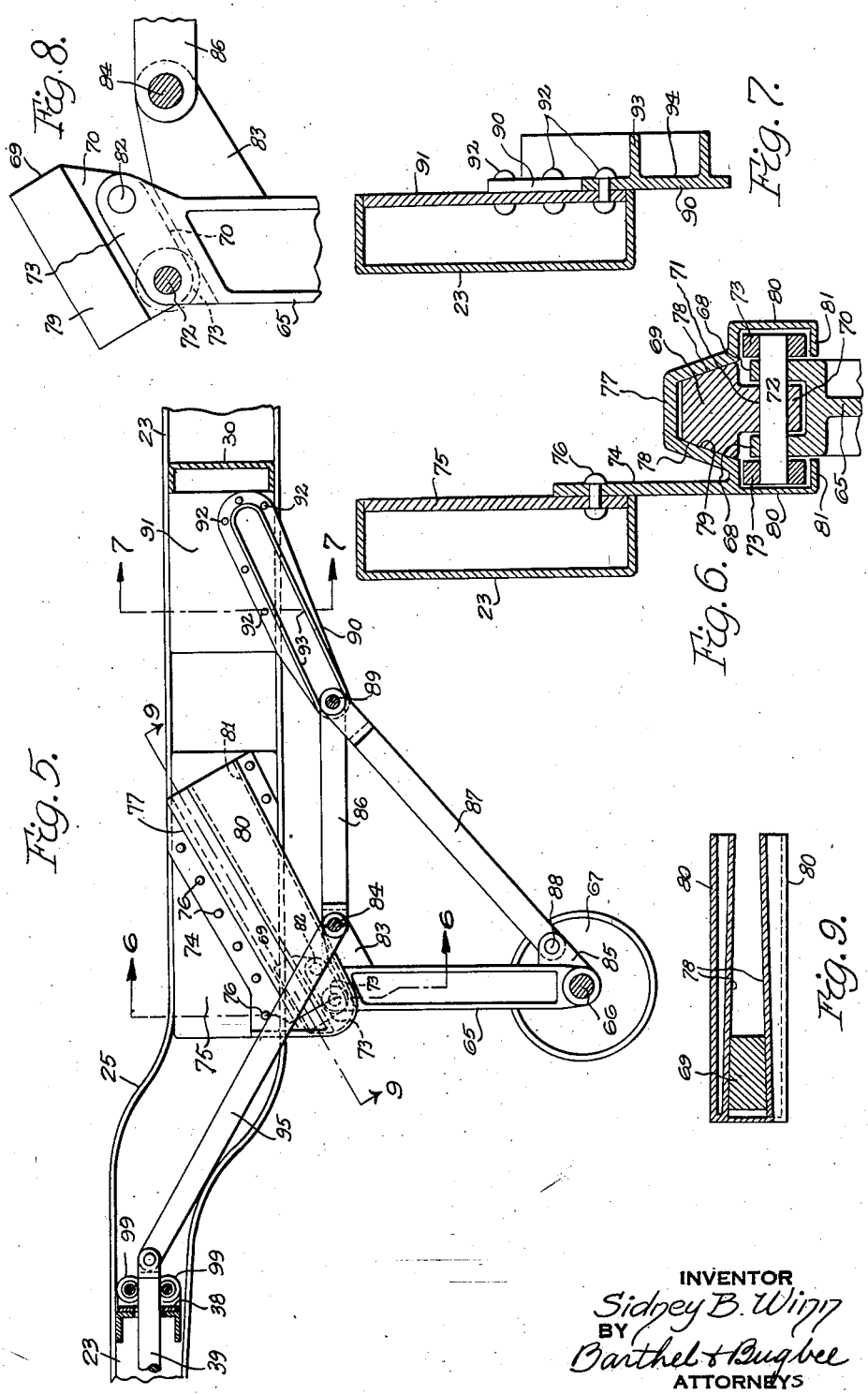
INVENTOR
Sidney B. Winn
BY
Barthel & Bugbee
ATTORNEYS Patented Nov. 25, 1947

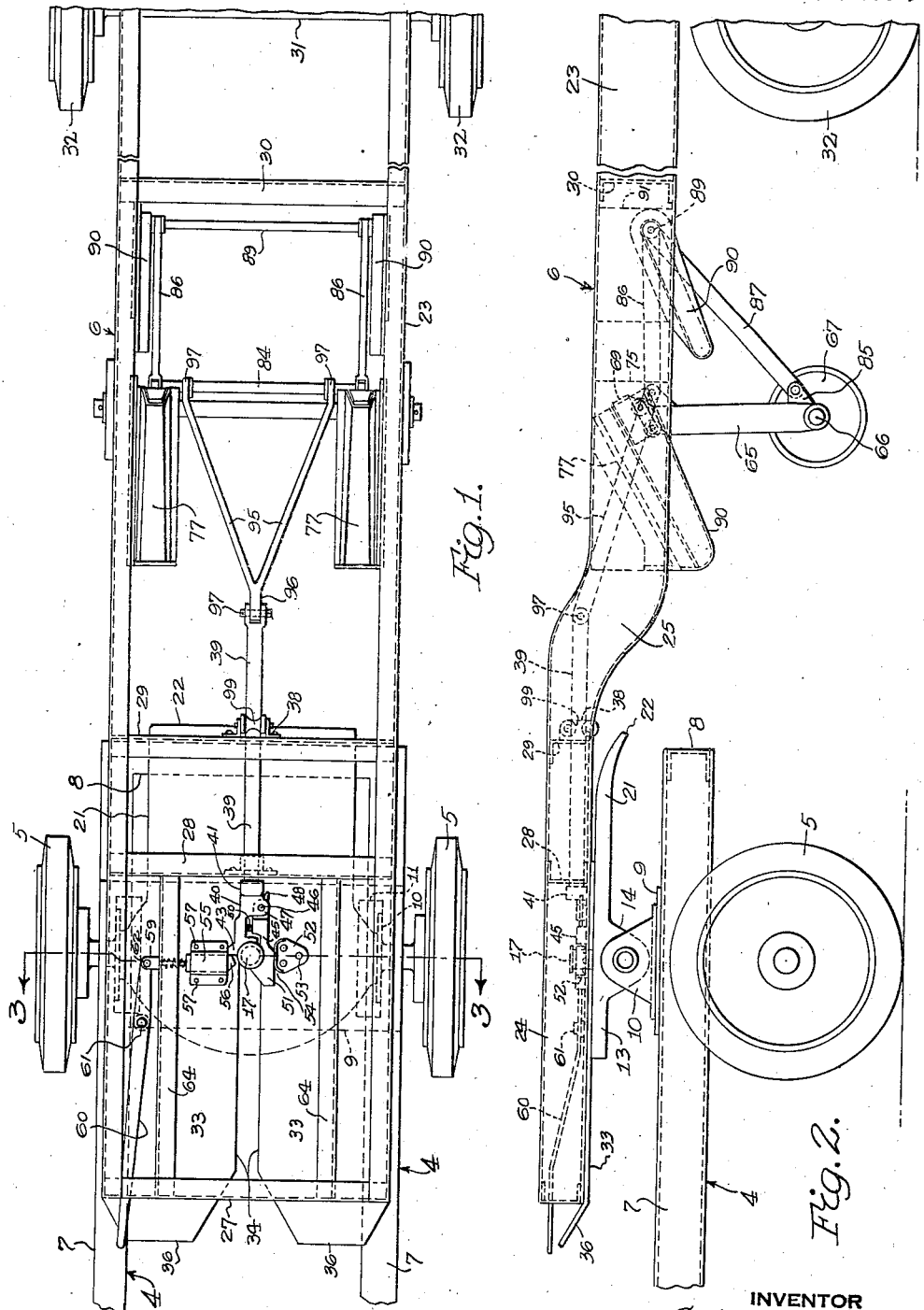

2,431,531

UNITED STATES PATENT OFFICE 2,431,531

TRACTOR-TRAILER COMBINATION AND TRAILER PROP

Sidney B. Winn, Lapeer, Mich.

Application November 3, 1945, Serial No. 626,486

20 Claims. (Cl. 280—33.1)

1

The present invention relates to motor vehicles, and more particularly, to a tractor-trailer assembly in which the trailer is connected in draft relationship with a tractor truck or the like.

The primary object of the invention is to provide a tractor-trailer assembly which may be easily coupled and uncoupled and to provide a trailer prop which is automatically controlled by the coupling and uncoupling movement of the tractor or truck with respect to the trailer.

Another object of the invention is to provide a tractor-trailer landing gear which will automatically seek a correct ground-engaging position dependent upon the terrain of the vehicle pathway and which will become self-set to any ground-engaging position regardless of irregularities in the ground surface on which the tractor and trailer combination is supported.

Another object of the invention is to provide a tractor-trailer assembly of the above-mentioned type in which the trailer prop is gravity biased and is elevated out of ground engagement automatically upon the coupling of the tractor truck and trailer in draft relationship.

Another object of the invention is to provide a tractor-trailer assembly in which the trailer prop is uniquely arranged so that it will be frictionally held in its ground-engaging position when the load of the front portion of the trailer is supported thereon.

Another object of the invention is to provide a tractor-trailer assembly in which the movement of the tractor into coupling engagement with the trailer will cause the trailer prop to be elevated out of ground engagement and be retained in an elevated position until such time as the tractor-trailer combination is uncoupled.

Another object of the invention is to provide a tractor-trailer assembly in which the trailer is provided with a trailer prop structure having vertically movable supporting legs provided with friction surfaces which are adapted to cooperate with inclined friction surfaces on the trailer structure to thereby provide mutually engaging frictional locking surfaces for holding the trailer prop extended in ground engagement when the load of the forward portion of the trailer is supported thereon and when the trailer is out of draft engagement with the tractor or truck.

Another object of the invention is to provide a tractor-trailer combination having a coupling structure including component coupling elements for holding the tractor and trailer in draft relationship and to provide means for operatively connecting one of the coupling elements to the

2 trailer prop so that upon movement of the tractor into and out of draft engagement with the trailer, the ground-engaging prop will be automatically raised and lowered without necessitating operation thereof on the part of the operator.

Another object of the invention is to provide a tractor-trailer assembly of the above-mentioned type which is adapted to prevent the dropping of the front end of the trailer to the ground when the tractor and trailer are uncoupled, thus preventing damage to the trailer, which is the conventional practice at present, should the operator forget to set the ground-engaging props before uncoupling the tractor-trailer combination.

Another object of the invention is to provide a tractor-trailer combination draft connection and ground-engaging prop which are so correlated as to facilitate the coupling and uncoupling of the tractor-trailer combination with a minimum amount of effort on the part of the driver and which is entirely foolproof.

Other objects and advantages of the invention will become apparent during the course of the following description of the accompanying drawings, wherein:

Figure 1 is a fragmentary top elevational view of the tractor-trailer combination showing the coupling therefor and the ground engaging prop control rod extending rearwardly therefrom;

Figure 2 is a fragmentary side elevational view of the tractor-trailer assembly showing the manner in which the ground-engaging trailer prop is connected to the trailer for vertical movement to and from an operative ground-engaging position;

Figure 3 is a vertical transverse cross-sectional view of the component coupling elements taken on line 3—3 of Figure 1 looking in the direction of the arrows and showing the various details of construction thereof;

Figure 4 is an enlarged fragmentary top elevational view of the rear end of the tractor and forward end of the trailer showing portions thereof broken away to illustrate the various details incident to the coupling structure;

Figure 5 is a longitudinal cross-sectional view of the prop structure carried by the trailer illustrating the manner in which the same is arranged for supporting the forward end of the trailer when the same is uncoupled from the tractor;

Figure 6 is a vertical cross-sectional view taken on line 6—6 of Figure 5 showing the mutually engaging frictional contact surfaces for supporting the prop structure when it is lowered into ground engagement;

Figure 7 is a vertical cross-sectional view taken on line 7—7 of Figure 5 showing one of the guide members for controlling the movement of the prop structure during the raising and lowering thereof;

Figure 8 is an enlarged fragmentary side elevational view of the upper portion of the prop structure illustrating the various details of construction of the friction shoe therefor; and Figure 9 is a longitudinal cross-sectional view taken on the oblique line 9—9 of Figure 5 looking in the direction of the arrows and showing the manner in which the supporting member is tapered longitudinally as well as transversely to provide compound angular friction surfaces for engaging the friction blocks carried by the prop structure.

In the drawings, the reference character 4 will generally be employed to indicate a tractor or truck structure which is adapted to be coupled to a trailer 6 as indicated in Figures 1 and 2.

The tractor truck structure 4 is of conventional design having traction wheels 5 and includes a chassis frame having side frame bars 7 connected at the end by a frame bar 8. The side frame bars 7 are further connected by a platform 9 at each end of which is provided a trunnion support 10 of bracket-shaped formation having foot portions 11 and opposed bearing bosses 12. A turntable 13 is adapted to be supported between the trunnion brackets 10 and is formed with depending extensions 14 having oppositely disposed trunnion pins 15. The trunnion pins 15 are received in bearing bosses 12 to permit forward and rearward tilting of the turntable 13 in the usual manner. A central enlarged boss 16 is formed on the turntable 13 to provide a support for a king pin 17 which has a reduced portion 18 extending through the opening in the boss 16 so as to be held therein by a nut 19 threaded on the lower end thereof. The uppermost end of the kingpin 17 is provided with an enlarged head 20. The turntable 13 is of conventional design and is more or less circular in shape (Figure 4 in dotted lines) and as usual is provided with a rearwardly extending ramp portion 21 which terminates in a downwardly extending end portion 22.

The trailer 6 includes a chassis frame having parallel side frame bars 23, the forward ends of which are vertically offset by deforming the chassis frame bars 23 as at 25. The chassis side frame bars 23 are adapted to be connected at the front and rear by transversely extending frame bars 27, and similarly, transversely extending frame bars 28, 29 and 30 are arranged between intermediate portions thereof to provide a rigid frame structure or chassis. The rear end of the trailer chassis is provided with an axle 31 having wheels 32 supporting the same. The forward end of the trailer is provided on its under side with a ramp plate 33 having a longitudinal slot 34 extending rearwardly from the front end thereof. The mouth of the slot is widened as at 35 and the forward end of the ramp plate 33 on each side thereof is upturned as at 36 to slide freely over the tail 21 of the turntable 13 during coupling and uncoupling of the tractor-trailer assembly.

Slidably mounted relative to the transverse frame bars 28 and 29 and supported in suitable bearings therein 37 and 38 is a rod 39 which has one end provided with a casting 40 having a tubular portion 41 for receiving the end of the longitudinal slide rod 39 so as to be affixed thereto by a locking pin 42. The casting 40 is provided with a kingpin-engaging foot member 43 having an arcuately curved recess 44 to conform to the contour of the kingpin 17 as clearly illustrated in Figure 4. Pivotally attached to the casting 40 is a movable jaw member 45 which is adapted to cooperate with the foot portion 43 of the casting to lock the kingpin 17 thereto. The pivoted jaw member 45 is provided with a pivot pin 46 which is received in bearing openings or recesses formed in lateral projections 47 formed integral with the casing 40 and extending on each side of the pivoted jaw member 45. A tail extension 48 is formed on the pivoted jaw member 45 for engaging the tubular projection 41 to thereby form a stop for said jaw member. The other end of the jaw member 45 is provided with a hooked portion 49 for partially encircling the kingpin 17 and locking the same against the curved recess 44 of the foot portion 43. A coil spring 50 is mounted between the casting 40 and pivoted jaw member 45 to yieldingly urge the same away from one another during uncoupling and yieldingly hold the jaw member 45 in the position shown in Figure 4, when the tractor and trailer are being uncoupled or coupled. The free swinging end of the pivoted jaw member 45 is slightly enlarged and provided with a surface 51 which is adapted to engage a keeper including a bracket 52 secured to the plate 33 by rivets or the like as at 53, and said bracket is provided with an upstanding flange 54 having the ends thereof curved slightly to facilitate rubbing contact with the surface 51 of the pivoted jaw member 45 during the coupling and uncoupling movement of the tractor and trailer. Thus, it will be noted that when the tractor and trailer are in coupled draft relationship, the flange 54 of the keeper plate will hold the pivoted jaw member 45 so that the hooked end thereof 49 is in locking engagement with the kingpin 17.

In order to hold the casting 40 and the pivoted jaw member 45 in their locked position with respect to the kingpin 17, a manually operable latch structure is provided and includes a bolt guide 55 having a sliding bolt 56, the end of which is presented to the slot 34 so as to lockingly engage the foot portion 43 of the casting 40. The guide 55 has its flanged portion secured to the plate 33 by rivets or the like as at 57. Formed integral with the bolt 56 is a rod 58 having a clevis 59 at one end thereof for receiving the inner end of the manual control lever 60. The control lever 60 is pivoted to the plate 33 by means of a pin 61 and a pin 62 extends through the clevis 59 and through the inner end of the lever 60 so that operation of the lever will retract the bolt 56 from the path of the foot 43 of the casting 40. A coil spring 63 encircles the shaft 58 and has one end in abutting relation with the bolt 56 and the opposite end arranged in abutting relation with one of a pair of longitudinal frame bars 64 connecting the transverse frame bars 27 and 28 and arranged on opposite sides of the slot 34. The rod 58 operates in a small opening in one of the longitudinal frame bars 54 as clearly indicated in Figure 4.

The prop structure for supporting the forward end of the trailer when the same is out of draft engagement with the tractor, is positioned adjacent the offset portion 25 of the chassis frame bars and includes a pair of props or legs 65 which are connected at their lower ends by means of an axle 66 on the ends of which are provided suitable ground-engaging wheels 67. The legs or props 65 may be interconnected by bracing or struts (not shown) and the upper ends thereof are bifurcated to provide furcations 68 between which is mounted a friction shoe member 69.

The friction shoe member 69 is provided with a reduced portion 70 having a transverse opening 71 for receiving a transverse pin 72, the ends of which project beyond the furcations 68 (Figure 6) and are provided with rollers 73 at each side of the upper end of the legs or props 65.

A supporting bracket 74 is riveted to each of the chassis frame bars 23 on the inside thereof, and in order to secure the supporting bracket 74 in place, a pair of plates 75 are welded to the flanges of the channel-shaped chassis frame bars 23 so that the supporting bracket 74 may be arranged obliquely thereto and be held in place by rivets 76 (Figures 5 and 6). The supporting bracket at each side of the chassis frame is formed with a guide 77 for receiving the friction shoe 69, and it is noted that the guide 77 is provided with inclined wall portions 78 which extend on a compound angle to produce longitudinal and lateral tapered surfaces and form with the inclined side portions 79 of the shoe 69 complementary mutually engaging friction surfaces for retaining the shoe 69 in a predetermined position. The side walls 79 of each shoe member 69 are likewise inclined on a compound angle to provide longitudinal and lateral tapered surfaces (Figure 9). Each of the guides 77 is provided with a pair of spaced depending wall portions 80 which are inturned as at 81 to form a support or guideway for the rollers 73 at each side of the shoe 69.

The friction shoes 69 are further secured to the upper ends of the legs or props 65 by means of additional retaining pins 82 which extend through the furcations 68 as well as the reduced central portion 70 of each friction shoe 69. The upper portion of each leg or prop is provided with a rearwardly extending bracket 83 for receiving a transversely extending rod 84, and similarly, the lower end of each leg or prop is provided with a rearwardly extending bracket 85 (Figures 2 and 5). Connected to the transversely extending shaft 84 of the brackets 83 is a pair of links 86, and connected to the rearwardly extending bracket 85 is a frame bar 87. Pivot pins 88 are provided for holding the frame bars 87 to the brackets 85 and the free ends of the frame bars 86 and 87 are connected to a transverse shaft 89 which has its ends provided with rollers (not shown) for being supported by an inclined guide bracket 90 at each side of the chassis frame. The guide brackets 90 are attached to blocks 91 welded or otherwise secured between the flanges of the channel-shaped chassis frame bar 23 so that the inclined guide brackets 90 may be riveted thereto as at 92. An elongated ovate flange 93 is formed in each guide bracket 90 to provide a guideway 94 for receiving the rollers on the end of the shaft 89. The vertical walls of the guide brackets 90 are arranged to prevent lateral movement of the rod 89 and displacement of the rollers from engagement with the elongated ovate flange 93.

The rear end of the longitudinally extending slide rod 39 is adapted to be connected to the transversely extending shaft 84 so that reciprocatory movement thereof will cause the prop structure to be elevated and lowered during coupling and uncoupling of the tractor-trailer combination. In order to accomplish this, a yoke member is provided having arms 95 which converge and are connected as at 96 for being received in a bifurcated portion of the rear end of the shaft 39 (Figure 1). A pivot pin 97 is provided for connecting the yoke member to the sliding shaft 39 and the free ends of the yoke arms 95 are provided with bearing members 97 for encircling the shaft 84 (Figure 1).

The reciprocating shaft 39 is adapted to be guided in slide bearings 37 and 38 and as shown in Figure 4, the slide bearing 37 includes a tubular portion for receiving the shaft 39, while the slide bearing 38 is of the anti-friction type and includes a pair of grooved rollers 99 arranged in opposed relation for receiving the rod 39. The structure is intended to permit free sliding movement of the rod 39 even though great pressure is applied thereto when backing the tractor into the trailer to couple the same and elevate the trailer prop structure.

The manual control lever 60 for operating the latch bolt 56 extends forwardly through an opening 100 in the front transverse cross frame bar 27 and is fashioned to provide a handle within easy reach of the operator or tractor driver. As illustrated in Fig. 4, the transversely extending front cross frame bar 27 is cut away as at 101 to facilitate passage of the kingpin 17 upon coupling and uncoupling of the tractor-trailer assembly.

It is to be noted that the taper of the inclined walls 78 of the oblique guide 77 is such as to cause the inclined side wall surfaces 79 of the friction shoe 69 to frictionally engage and form mutual locking surfaces to hold the props or legs 65 in a lowered position when the trailer is uncoupled from the tractor and the weight of the trailer and its load is supported thereby.

*Operation of the invention*

When the tractor and trailer are assembled in draft relationship, as shown in Figures 1, 2 and 3, the slide rod 39 is held in its rearmost position with the ground-engaging wheels 67 elevated above the roadway or surface over which the tractor-trailer combination will be driven. When it is desired to uncouple the tractor-trailer combination, the manual control lever is operated to retract the bolt 56 and thereby permit forward movement of the tractor away from the trailer, by reason of the fact that the end of the bolt 56 has been retracted from the path of movement of the foot 43 on the casting 40. During initial movement of the kingpin 17 outwardly through the slot 34 of the plate 33, the trailer supporting props 65 will be pulled forwardly and downwardly by the link 95 and rod 39 and while the front end of the trailer is still partially supported on the turntable 13. Upon continued movement of the tractor away from the trailer, the supporting plate 33 of the trailer will move off of the turntable 13 and the tractor and trailer may separate as usual. As this occurs, the trailer props 65 will have reached their ground-engaging position so that the wheels 67 will come to rest on the ground surface. When the trailer is free from the tractor and the weight of the trailer 5 is removed from the tractor 4, the vertical thrust on the friction shoe 69 will force the compound angle inclined side walls thereof as at 79 into frictional engagement with the compound angle inclined side walls 78 of the obliquely arranged guide member 77 so as to prevent the rearward movement of the friction shoe 69. Thus, the trailer will be supported with the front end thereof in an elevated position.

It will be noted that the upward force exerted on the friction shoes 69 when the prop landing gear is in its ground-engaging position will cause the compound angular surfaces 79 on each shoe to be forced into wedging engagement with the longitudinally and laterally tapered surfaces 78 on their respective guides 77.

During coupling of the tractor 4 with the trailer 6, the tractor or truck is manipulated to move the turntable 13 beneath the trailer supporting plates 33 so that the king pin 17 will enter the mouth 35 of the slot 34 and will finally engage the foot 43 on the casting 40. Normally, the prop structure will fall by gravity as soon as the trailer has been elevated sufficiently to raise the ground-engaging wheel 67 out of engagement with the surface upon which the trailer is supported. However, should the shoe members 79 become stuck in the tapered guide members 77, continued rearward movement of the tractor or truck with respect to the trailer will cause the shoe members to be dislodged by reason of the fact that the longitudinally extending slide rod 39 will move rearwardly and the initial thrust thereof will cause the slide shoe 69 to be disengaged from frictional locking engagement with the side wall 78 of the obliquely arranged slide guide 77 so that said shoe will drop away from said surfaces 78 and become supported by the rollers 75 on the internal guide flange 81.

Upon continued rearward movement of the tractor relative to the trailer, the trailer supporting prop 65 will be elevated and the trailer props will be supported by the rollers 73 and inturned flanges 81 on the obliquely arranged guides 77. When the kingpin 17 reaches the limit of its movement within the slot 34, the pivoted locking jaw 45 will simultaneously engage the flange 54 of the keeper 52 and cause the jaw 49 thereof to engage the kingpin 17 against the yielding action of the coil spring 59, and during such engagement, the latch bolt 56 will be automatically retracted when the foot portion 43 moves therepast so as to be again projected by the yielding action of the coil spring 58 into the path of said foot portion 43 and thereby securely hold the kingpin 17 in its locked position and the tractor and trailer in draft engagement.

It is to be noted that the inturned flanges 81 are tapered slightly with respect to the top walls of the guides 77 from the upper end thereof to the lowermost end so that when the tractor and trailer are separated, the friction locking shoe 69 will be moved toward the friction surfaces 78 thereof at substantially the same time that the ground-engaging wheels 67 contact the ground or surface upon which the trailer is to be supported. This construction also aids in freeing the friction shoes 69 during the initial coupling movement of the tractor with relation to the trailer. It is to be understood that during the uncoupling of the tractor-trailer combination, the brakes of the trailer are set so that relative movement between the tractor and trailer may be accomplished with facility.

It is to be understood that the form of the invention herewith shown and described is to be taken as a preferred embodiment thereof and that various changes may be made in the shape, size and arrangement of parts without departing from the spirit of the invention or the scope of the subjoined claims.

What I claim is:

1. In a tractor-trailer combination, a tractor vehicle, a trailer vehicle, component coupling elements on the tractor and trailer for locking the same in draft engagement, a supporting structure for the front end of said trailer when the tractor and trailer are separated, said supporting structure being gravity biased to move to an operative ground-engaging position when the tractor and trailer are separated, a control member for raising said supporting structure out of ground engagement when said tractor and trailer are moving into draft engagement, and mutually engaging wedge-shaped mating surfaces on the trailer and supporting structure and urged into frictional locking engagement with one another in response to the weight of the trailer thereon for retaining the supporting structure in its operative position.

2. In a tractor-trailer combination, a tractor vehicle, a trailer vehicle, component coupling elements on the tractor and trailer for locking the same in draft engagement, a supporting structure for the front end of said trailer when the tractor and trailer are separated, said supporting structure being gravity biased to move to an operative ground-engaging position when the tractor and trailer are separated, a control member engageable with the coupling element carried by said tractor for raising said supporting structure out of ground engagement when said tractor and trailer are moved into draft engagement, and wedge-shaped mating members carried by the trailer and supporting structure and urged into frictional locking engagement with one another in response to the weight of the trailer thereon to provide mutually engaging retaining means for said supporting structure when the same is in its operative position.

3. In a tractor-trailer combination including a traction vehicle and a trailer vehicle, a king pin carried by one of said vehicles, a coupling member carried by the other of said vehicles for receiving said king pin to lock the trailer in draft engagement with said tractor, a forwardly and downwardly inclined guide member carried on the front end of the trailer having a guideway provided with longitudinally extending wall surfaces arranged to provide tapered locking surfaces, a ground-engaging prop structure for said trailer, a friction shoe on the upper end of said prop structure having inclined side walls for being frictionally received in said guideway between said wall surfaces, and means on the trailer engageable with the tractor for causing relative movement between said guide member and prop structure to cause the prop structure to be moved to an inoperative position when the tractor and trailer are coupled in draft engagement.

4. In a tractor-trailer combination including a traction vehicle and a trailer vehicle, a king pin carried by one of the vehicles, a coupling member carried by the other of said vehicles for receiving said king pin to lock the trailer in draft engagement with said tractor, a forwardly and downwardly inclined guide member carried on the front end of the trailer having a guideway provided with longitudinally extending wall surfaces inclined on a compound angle and arranged to provide longitudinally and laterally tapered locking surfaces, a ground-engaging prop structure for said trailer, a friction shoe on the upper end of said prop structure having inclined side walls complementary with the compound angle surfaces on the guide member for being frictionally received in said guideway between said wall surfaces, means on the trailer engageable with said king pin for moving said prop structure to an inoperative position when the tractor and trailer are coupled in draft engagement, and means for locking said last-named means against movement.

5. In a tractor-trailer combination including a traction vehicle and a trailer vehicle, a king pin carried by one of the vehicles, a coupling member carried by the other of said vehicles for receiving said king pin to lock the trailer in draft engagement with said tractor, a forwardly and downwardly inclined guide member carried on the front end of the trailer having a guideway provided with longitudinally extending wall surfaces inclined on a compound angle and arranged to provide longitudinally and laterally tapered locking surfaces, a ground-engaging prop structure for said trailer, a friction shoe on the upper end of said prop structure having inclined side walls complementary with and for being frictionally received in said guideway between said wall surfaces, a movable member having one end connected to the coupling member and operable upon engagement of the king pin with said coupling member to move said prop structure to an elevated position, and means for locking the movable member against movement to hold said prop structure elevated and to lock said tractor and trailer in draft engagement.

6. In a tractor-trailer combination including a traction vehicle and a trailer vehicle, a king pin carried by one of said vehicles, a coupling member carried by the other of said vehicles, for receiving said king pin to lock the trailer in draft engagement with said tractor, a forwardly and downwardly inclined guide member carried on the front end of the trailer having a guideway provided with longitudinally extending wall surfaces arranged to provide tapered locking surfaces, a ground-engaging prop structure for said trailer, a friction shoe on the upper end of said prop structure having inclined side walls for being frictionally received in said guideway between said wall surfaces, and means on the trailer engageable with said king pin for moving said prop structure to an inoperative position when the tractor and trailer are coupled in draft engagement, said prop structure being gravity biased and arranged to slide forwardly and downwardly into ground engagement when the tractor and trailer assembly is separated.

7. In a tractor-trailer vehicle combination, a tractor vehicle, a trailer vehicle, a king pin carried by one of said vehicles for being received in a king pin slot in the other of said vehicles, a slide rod carried by the trailer for longitudinal movement, a king pin engaging member on one end of said slide rod positioned in registry with said slot in the path of movement of said king pin, a locking jaw carried by said king pin engaging member for locking said king pin to said king pin engaging member, a gravity biased prop structure secured to the front end of said trailer, a guide member having a guideway provided with tapered wall surfaces, a shoe member of tapered cross-section mating with said tapered wall surfaces and carried on the upper end of said prop structure for movement in said guideway and urged into frictional locking engagement with said guideway in response to the weight of the trailer on said prop structure, said guide member being inclined forwardly and downwardly so that the prop structure will slide forwardly and downwardly into ground engagement, means connecting said prop structure to said king pin engaging member whereby movement of said tractor into coupling engagement with said trailer will elevate said prop structure, and means for locking said king pin engaging member against movement and said locking jaw in coupled relation with said king pin whereby said prop structure will be locked in its elevated position after coupling of said tractor and trailer vehicles.

8. In a tractor-trailer vehicle combination, a tractor vehicle, a trailer vehicle, a king pin carried by one of the vehicles for being received in a king pin slot in the other of said vehicles, a slide rod carried by the trailer for longitudinal movement, a king pin engaging member on one end of said slide rod positioned in registry with said slot in the path of movement of said king pin, a locking jaw carried by said king pin engaging member for locking said king pin to said king pin engaging member, a gravity biased prop structure on the front end of said trailer, a guide member positioned on each side of said trailer having a guideway provided with longitudinally and transversely tapered wall surfaces, a shoe member having tapered surfaces complementary with the surfaces of said guide member carried on the upper end of said prop structure for movement in said guideway, said guide member being inclined forwardly and downwardly so that the prop structure will slide forwardly and downwardly into operative position, means connecting said prop structure to said king pin engaging member whereby movement of said tractor into coupling engagement with said trailer will elevate said prop structure, and means for locking said king pin engaging member against movement and said locking jaw in coupled relation with said king pin whereby said prop structure will be locked in its elevated position after coupling of said tractor and trailer vehicles, said shoe member and tapered guide surfaces being arranged to provide mutually engaging friction locking surfaces so that the weight of the trailer when uncoupled from said tractor will be supported on said prop structure and thereby urge said friction surfaces into contactual locking engagement to prevent retraction of said prop structure.

9. In a tractor-trailer vehicle combination, a tractor vehicle, a trailer vehicle, a king pin carried by one of the vehicles for being received in a king pin slot in the other of said vehicles, a slide rod carried by the trailer for longitudinal movement, a king pin engaging member on one end of said slide rod positioned in registry with said slot in the path of movement of said king pin, a locking jaw carried by said king pin engaging member for locking said king pin to said king pin engaging member, a gravity biased prop structure secured to the front end of said trailer, a guide member on each side of the trailer having a guideway provided with tapered wall surfaces, a shoe member of tapered cross-section mating with said tapered wall surfaces and carried on the upper end of said prop structure at each side thereof for movement in said guideway and urged into frictional locking engagement with said guideway in response to the weight of the trailer on said prop structure, said guide member being inclined forwardly and downwardly so that the prop structure will slide forwardly and downwardly into ground engagement, means connecting said prop structure to said king pin engaging member whereby movement of said tractor into coupling engagement with said trailer will elevate said prop structure, means for locking said king pin engaging member against movement, means for holding said locking jaw in coupled relation with said king pin whereby said prop structure will be locked in its elevated position after coupling of said tractor and trailer vehicles, and brace members connecting said prop structure with said trailer.

10. In a tractor-trailer vehicle combination, a tractor vehicle, a trailer vehicle, a king pin carried by one of the vehicles, for being received in a king pin slot in the other of said vehicles, a slide rod carried by the trailer for longitudinal movement, a king pin engaging member on one end of said slide rod positioned in registry with said slot in the path of movement of said king pin, a locking jaw carried by said king pin engaging member for locking said king pin to said king pin engaging member, a gravity biased prop structure positioned on the front end of said trailer, a guide member at each side of said trailer having a guideway provided with tapered wall surfaces, a shoe member of tapered cross-section mating with said tapered wall surfaces and carried on the upper end of said prop structure at each side thereof for movement along said guideway and urged into frictional locking engagement with said guideway in response to the weight of the trailer on said prop structure, said guide member being inclined forwardly and downwardly so that the prop structure will slide forwardly and downwardly under gravity to its lowermost position, means connecting said prop structure to said king pin engaging member whereby movement of said tractor into coupling engagement with said trailer will elevate said prop structure, means for locking said king pin engaging member against movement, and means for holding said locking jaw in coupled relation with said king pin whereby said prop structure will be locked in its elevated position after coupling of said tractor and trailer vehicles, and manual control means for said last-named means operable from a position adjacent the king pin.

11. In a trailer prop structure, inclined guide means carried by the trailer, a trailer prop frame having one end movably mounted in said guide means, and mutually engaging wedge-shaped surfaces on the prop frame and guide means, said surfaces being urged into frictional locking engagement with one another in response to the weight of the trailer thereon for holding said prop frame in its operative position.

12. In a trailer prop structure, guide means at each side of said trailer arranged obliquely and extending forwardly and downwardly, a pair of prop legs having their upper ends movably mounted one within each of said guide means, and mutually engaging wedge-shaped frictional locking surfaces on said guide means and prop legs, said surfaces being urged into frictional locking engagement with one another in response to the weight of the trailer thereon to retain said prop structure in its operative position when the trailer is detached from a tractor.

13. In combination with a trailer having supporting wheels at the rear thereof, a prop structure for supporting the front end of the trailer when the same is detached from a traction vehicle, comprising a pair of guide members arranged one at each side of said trailer adjacent the front end thereof and inclined forwardly and downwardly, a pair of prop members provided at their lower ends with ground-engaging rollers and positioned with their upper ends in said guide members, and mutually engaging wedge-shaped frictional locking surfaces on said prop members and guides, said surfaces being urged into frictional locking engagement with one another in response to the weight of the trailer thereon to hold the prop members extended with the rollers thereof in ground engagement when the trailer is uncoupled from a traction vehicle.

14. In combination with a trailer having supporting wheels at the rear thereof, a prop structure for supporting the front end of the trailer when the same is detached from a traction vehicle, comprising a pair of guide members arranged one at each side of said trailer adjacent the front end thereof and inclined forwardly and downwardly, a pair of prop members provided at their lower ends with ground-engaging rollers and positioned with their upper ends in said guide members, and mutually engaging wedge-shaped frictional locking surfaces on said prop members and guides, said surfaces being urged into frictional locking engagement with one another in response to the weight of the trailer thereon to hold the prop members extended with the rollers thereof in ground engagement when the trailer is uncoupled from a traction vehicle, said friction surfaces being tapered so that the weight of the trailer will force the same into tight contactual engagement one with the other.

15. In a trailer prop structure, guide means at each side of said trailer arranged obliquely and extending forwardly and downwardly, a pair of prop legs having their upper ends movably mounted one within each of said guide means, and mutually engaging wedge-shaped frictional locking surfaces on said guide means and prop legs, said surfaces being urged into frictional locking engagement with one another in response to the weight of the trailer thereon to retain said prop structure in its operative position when the trailer is detached from a tractor, said friction surfaces being tapered on a compound angle so that the weight of the trailer will force the same into tight contactual engagement one with the other.

16. In a trailer landing gear structure, in combination with a vehicle trailer, inclined guide means carried by the trailer, a trailer prop frame having one end movably mounted in said guide means, and mutually engaging friction surfaces on the prop frame and guide means for holding said prop frame in its operative position, said friction surfaces being inclined on a compound angle to provide laterally and longitudinally extending tapered wall surfaces so that the weight of the trailer will force the same into tight contactual engagement one with the other.

17. In a supporting structure for trailer vehicles, a guide member carried by said trailer at each side thereof, said guide members being inclined forwardly and downwardly, a trailer prop frame having its upper end slidably supported on said guide members, and mutually engaging wedge-shaped frictional locking surfaces on said prop frame and guide members, said surfaces being urged into frictional locking engagement with one another in response to the weight of the trailer thereon for holding said prop frame in its operative position.

18. In a tractor-trailer vehicle assembly, component coupling elements for holding said tractor and trailer in draft relationship, a prop structure for said trailer, guide means on said trailer for supporting said prop structure having inclined guides extending forwardly and downwardly, mutually engaging wedge-shaped friction locking surfaces on the guide means and prop structure, said surfaces being urged into frictional locking engagement with one another in response to the weight of the trailer thereon for holding said prop structure in an extended position, and means controlled by the coupling and uncoupling of said component coupling elements for moving said prop structure to an elevated position.

19. In a tractor-trailer vehicle assembly component coupling elements for locking said tractor and trailer in draft relationship, an inclined guide member on the forward end of said trailer at each side thereof, a trailer prop structure supported on guide members, mutually engaging tapered locking surfaces on said guide members and prop structure, said surfaces being urged into frictional locking engagement with one another in response to the weight of the trailer thereon for frictionally locking said prop structure in its operative position, and rod means connecting the prop structure controlled by the coupling movement of said component coupling elements for raising said prop structure out of ground engagement to an inoperative position when said tractor and trailer are coupled in draft engagement.

20. In a tractor-trailer vehicle assembly, component coupling elements for locking said tractor and trailer in draft relationship, an inclined guide member on the forward end of said trailer at each side thereof, a trailer prop structure supported by said guide members, mutually engaging tapered locking surfaces on said guide members and prop structure, said surfaces being urged into frictional locking engagement with one another in response to the weight of the trailer thereon for frictionally locking said prop structure in its operative position, and rod means connecting the prop structure and controlled by the coupling movement of said component coupling elements for raising said prop structure to an inoperative position when said tractor and trailer are coupled in draft engagement, said prop structure being gravity-biased to move to an operative position during the uncoupling of said component coupling elements.

SIDNEY B. WINN.

REFERENCES CITED

The following references are of record in the file of this patent:

UNITED STATES PATENTS

| Number | Name | Date |
| --- | --- | --- |
| 1,548,967 | Winn | Aug. 11, 1925 |
| 2,277,179 | Winn | Mar. 24, 1942 |